United States Patent [19]

Banks et al.

[11] Patent Number: 4,702,362
[45] Date of Patent: Oct. 27, 1987

[54] FRICTION CLUTCH FOR A VEHICLE

[75] Inventors: John D. Banks, Whitnash; Robert J. Ball, Bishops Itching; Denzil J. W. Symonds, Warwick, all of England

[73] Assignee: Automotive Products plc, Leamington Spa, England

[21] Appl. No.: 872,390

[22] Filed: Jun. 10, 1986

[30] Foreign Application Priority Data

Jun. 10, 1985 [GB] United Kingdom ............... 8514600
May 8, 1986 [GB] United Kingdom ............... 8611222

[51] Int. Cl.$^4$ ............................................. F16D 23/14
[52] U.S. Cl. .................................. 192/98; 192/70.13; 192/DIG. 1
[58] Field of Search ............... 192/70.13, 89 B, 98, 192/110 B, DIG. 1

[56] References Cited

U.S. PATENT DOCUMENTS

| | | | |
|---|---|---|---|
| 3,887,222 | 6/1975 | Hammond | 285/307 |
| 4,228,882 | 10/1980 | Huber et al. | 192/98 |
| 4,352,419 | 10/1982 | Olschewski et al. | 192/98 |
| 4,502,583 | 3/1985 | Limbacher | 192/98 |
| 4,529,075 | 7/1985 | Renaud | 192/98 |
| 4,560,053 | 12/1985 | Lassiaz | 192/98 |
| 4,588,061 | 5/1986 | Mallet | 192/98 |
| 4,632,237 | 12/1986 | Maycock et al. | 192/98 |
| 4,646,897 | 3/1987 | Winters | 192/98 |
| 4,646,898 | 3/1987 | Muller | 192/98 |
| 4,658,945 | 4/1987 | Muller | 192/89 B |

FOREIGN PATENT DOCUMENTS

| | | |
|---|---|---|
| 2557234 | 6/1985 | France . |
| 2557235 | 6/1985 | France . |
| 2013820 | 1/1979 | United Kingdom . |
| 2098697 | 11/1982 | United Kingdom ............. 192/70.13 |
| 2131515 | 6/1984 | United Kingdom . |
| 2138095 | 10/1984 | United Kingdom . |
| 2140524 | 10/1984 | United Kingdom . |
| 2157791 | 10/1985 | United Kingdom . |

Primary Examiner—Leslie Braun
Assistant Examiner—Richard M. Lorence
Attorney, Agent, or Firm—Solon B. Kemon

[57] ABSTRACT

A friction clutch for a vehicle includes a clutch release mechanism comprising a first member, a second member, a detent arranged to locate the first member relative to the second member on assembly by moving the first member in one direction relative to the second member whereby a clutch release force subsequently applied to said first member in an opposite direction will be transmitted to said second member to release the clutch, and a detent release sleeve which enables the detent to be released by urging said first member further in said one direction relative to said second member so that the first and second members can thereafter be separated. The detent is carried by one of the members and the detent release sleeve is carried by the other of the members whereby on separation of the members following release of the detent the detent and detent release sleeve disengage and remain on their respective members.

29 Claims, 20 Drawing Figures

FRICTION CLUTCH FOR A VEHICLE

The invention relates to a friction clutch for a vehicle.

U.S. Pat. No. 4,632,237 is concerned with a friction clutch having a release mechanism which facilitates particularly easy assembly and dis-assembly of the clutch release components. In the clutch of U.S. Pat. No. 4,632,237 the release mechanism comprises a first member, a second member, a detent arranged to locate the first member relative to the second member by moving the first member in one direction relative to the second member whereby a clutch release force subsequently applied to said first member in an opposite direction will be transmitted to said second member to release the clutch, and detent release means which enables the detent to be released by urging said first member further in said one direction relative to said second member so that the first and second members can thereafter be separated.

Following release of the detent and separation of the members, it is necessary to re-assemble the detent or the release means on the appropriate member before the first and second members can be relocated relative to each other again by the detent. The detent and release means are relatively small components and the need to re-assemble them can increase the risk of losing them in the workshop. An object of the present invention is to provide a friction clutch having a clutch release mechanism in which such re-assembly of the detent or release means is unnecessary.

According to one aspect of the invention there is provided a friction clutch for a vehicle which includes a clutch release mechanism comprising a first member, a second member, a detent arranged to locate the first member relative to the second member on assembly by moving the first member in one direction relative to the second member whereby a clutch release force subsequently applied to said first member in an opposite direction will be transmitted to said second member to release the clutch and detent release means which enables the detent to be released by urging said first member further in said one direction relative to said second member so that the first and second members can thereafter be separated, said detent being carried by one of said members and the detent release means being carried by the other of said members whereby on separation of the members following release of the detent said detent and detent release means disengage and remain on their respective members.

The detent may be a ring held axially captive on said one member and the detent release means may be a sleeve held axially captive on said other member.

The detent release means may be movable axially on said other member to define a location recess between a shoulder on said other member and an adjacent surface of the detent release means which location recess, in use, locates part of the detent to enable clutch release forces to be transmitted, the detent including a further part located in a recess in said one member. In such a case, a leading surface of said other member in the assembly direction may be engageable with the detent whereby the detent is resiliently urged on assembly into the recess in the one member, said detent thereafter being arranged to snap into said location recess subsequent to disengaging said leading surface. Preferably, the release member is arranged to resiliently urge the detent into said recess in said one member so as to disengage the location recess to effect release of the detent on movement of the first member in said one direction, whereby on separation of the first and second members relative movement will take place between the said other member and the detent release means until the detent release means and said one shoulder interengage enabling the detent to re-engage the leading surface of the other member.

The detent release means may comprise a sleeve one end of which is arranged to engage the detent when said first member is moved in said one direction. Said one end of the sleeve may be formed with a chamfer over which the detent rides when moving into a released position on to a peripheral surface of the sleeve. Where there is a shoulder on said other member said shoulder may be of frusto conical form. Likewise, where there is a recess in said one member, said recess may have a wall of frusto-conical form. Preferably the angle of inclination to the clutch axis of said frusto-conical shoulder is different from, e.g. greater than, the angle of inclination to the clutch axis of said frusto conical wall. Preferably, the frusto conical shoulder and frusto conical wall are inclined in the same direction.

Where the detent release means comprises a sleeve, the sleeve may have peripheral surface which frictionally engages a surface of said one member.

The detent may comprise a split ring. In one embodiment the detent ring may comprise a resilient non circular split-ring having corners which engage in a tubular said one member so as to maintain the split ring coaxial with said one member.

In another embodiment, the detent may comprise a split ring within a non-circular surrounding element corners of which engage in a tubular said one member so as to maintain the split ring coaxial with said one member. The split ring may resiliently engage straight surface portions of said non-circular element and the element may be of polygonal form.

The detent may be substantially rotatably fast with said one member. In such a case, the detent means may include a projection which locates in said one member to inhibit relative rotation between detent and said one member. A portion of said detent may engage said other member so as to inhibit relative rotation between the first and second members. For example, said portion of the detent may locate in an aperture or socket in said other member.

The detent may comprise a split ring formed from a strip of material, said strip being formed with a plurality of axial slits extending from one edge thereof and having alternate sections of material between the slits bent for engagement with said other member. Where the detent means includes said projection, the projection may be formed on an edge of the strip opposite said one edge. Where a portion of the detent locates in said aperture or socket in the other member, said portion may comprise one of said alternate sections. The first member may locate within a bore in the second member with the detent release means carried by the first member, and the detent may be located in the bore between the two members and arranged so as to ride on to the outher peripheral surface of the detent release means.

To inhibit accidental release movement of the first member in said one direction relative to the second member, an element may be locatable between the first and second member, which element can be positioned to permit release of said first member.

The element may be a spring clip which resiliently grips one of the members and which can be removed to permit said release.

A section of the detent release means engageable with a surface of said detent to initiate release of the detent may be arranged at a distance from the rotational axis of the clutch different from that of a centre of curvature of said surface of the detent. Where the detent release means is a sleeve formed with a chamfer, said section may be a circumferential line of intersection of the chamfer and an end of the sleeve. In the case where the detent is a ring, the mean diameter of the ring may be different from the diamenter of the circumferntial line of intersection. Various embodiments of the invention will now be described by way of example with reference to the accompanying drawings in which.

Figure 1:
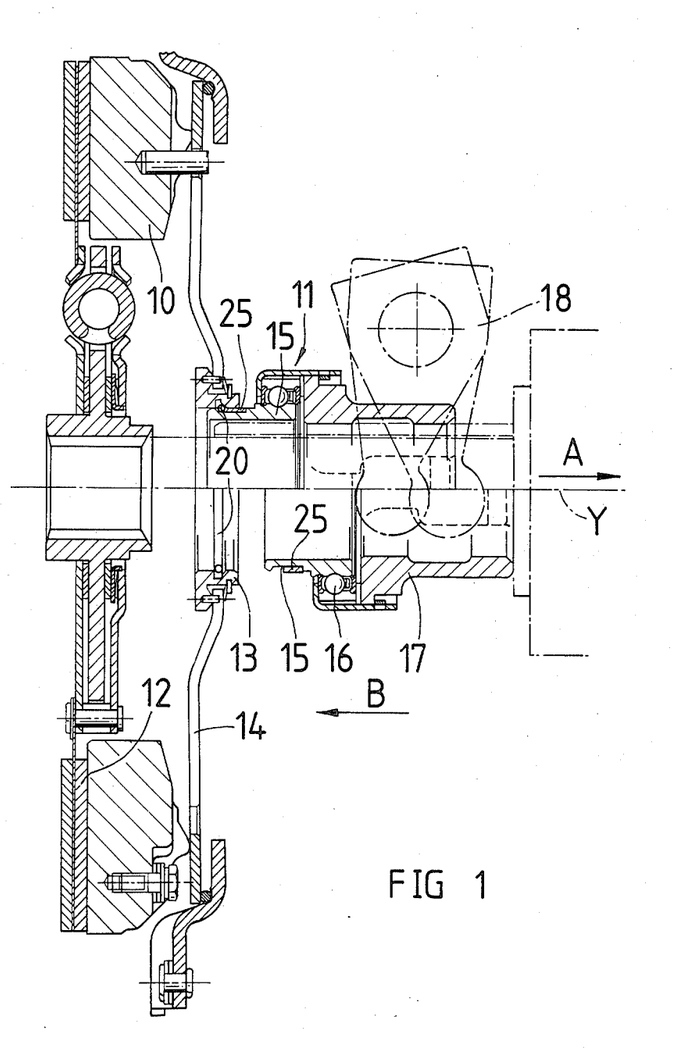
FIG. 1 is a cross section through a friction clutch in accordance with the invention, FIGS. 2,3, 4,5 and 6 drawn to a larger scale show the way in which a clutch release mechanism of the clutch of FIG. 1 is assembled and disassembled.

In FIG. 1 there is shown a friction clutch in which a clutch pressure plate 10 is retracted by a clutch release mechanism 11 to release a clutch driven plate 12. Clutch release is effected by applying a force in direction A to a hub 13 of a clutch spring 14 through a short hollow shaft 15, clutch release bearing 16 and a pull member 17. The releasing force is applied by means of a release fork 18 which engages the pull member 17. The lower half of FIG. 1 shows the position of shaft 15, release bearing 16, pull member 17 and fork 18 in a position released from hub 13.

Figure 2:
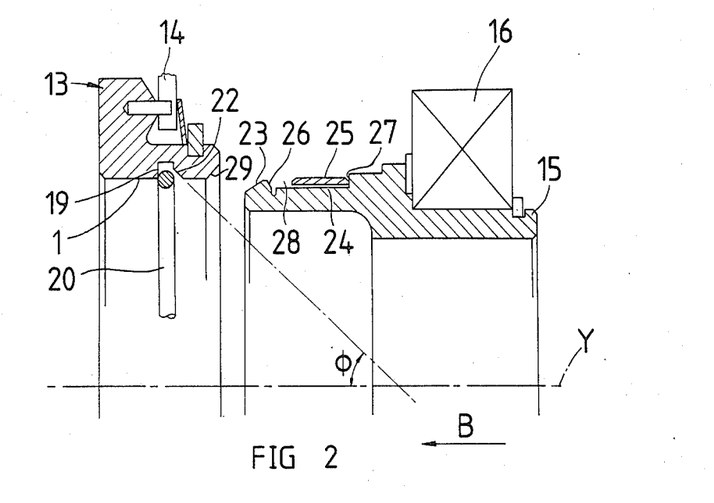
Figure 2A:
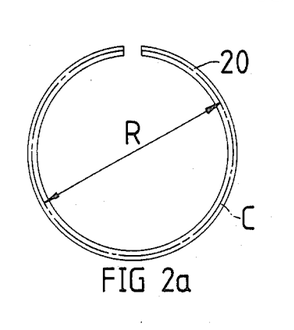
FIGS. 2a, and 2b are elevations of a detent ring and detent release sleeve respectively.
Figure 2B:
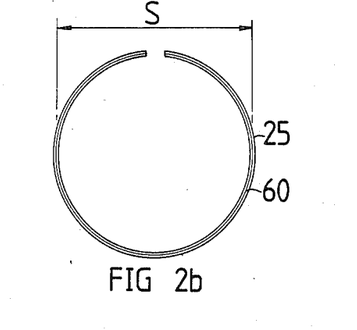
Figure 3:
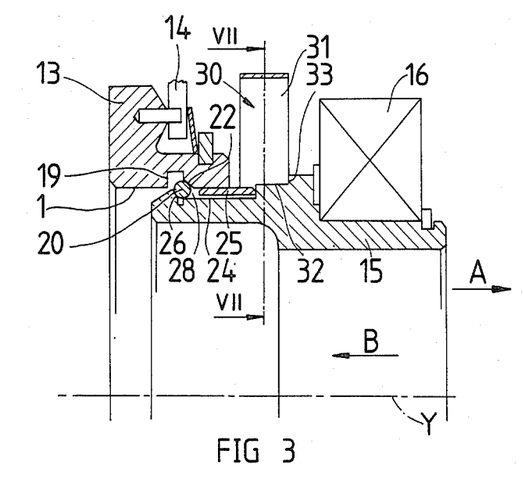
Figure 4:
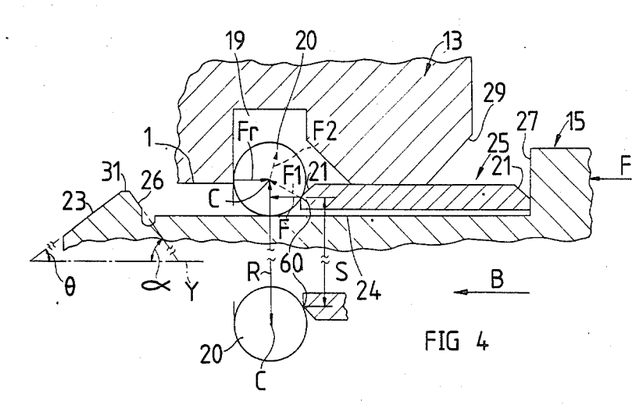

Referring now to FIGS. 2 to 4 the spring hub 13 (constituting the aforesaid second member) has a bore 1 formed with a peripheral groove 19 which locates a detent 20 in the form of a resilient split ring as drawn to a smaller scale in FIG. 2a. The ring may be formed from spring steel. The outer diameter of the split ring is less than the diameter of groove 19 to allow the ring to be expanded. Part 22 of the right hand side of groove 19 as viewed in FIG. 2 is of frusto conical form e.g. inclined at an angle $\phi$ of 45° to the axis of the clutch indicated at Y. The shaft 15 (constituting the aforesaid first member) has a frusto conical left hand end surface 23 which is inclined to the axis Y at an angle $\theta$, e.g. around 35°, as in FIG. 4. The shaft 15 is formed with a wide external groove 24 having a left hand end defined by a frusto conical shoulder 26 inclined to the axis Y at an angle $\alpha$ e.g. around 55°. The right hand end of the groove 24 is defined by a radial shoulder 27. A split cylindrical sleeve 25 (constituting the detent release means) locates in the groove 24 and is freely slidable axially between end shoulders 26,27 of the groove, the shoulders holding the sleeve captive on the shaft 15. The sleeve 25 is formed from a strip of material, e.g. spring steel bent into cylindrical form as in FIG. 2b. The strip is formed with chamfers 21 as shown in FIG. 4 inclined at 45° to the sleeve axis and the outside diameter of the sleeve in its relaxed condition is slightly greater than the diameter of the bore 1 in the shaft 15. The chamfers intersect the respective ends of the sleeve along circumferential lines 60. Where the sleeve 25 abuts shoulders 27, a recess 28 is defined between shoulder 26 and the left hand end of sleeve 25.

To assemble the clutch release mechanism 11, the shaft 15 along with bearing 16 thereon is moved from the FIG. 2 position in the direction of arrow B so that the frusto conical surface 23 abuts the split detent ring 20 causing it to expand into the groove 19 and ride over the surface 23 until it eventually snaps into the recess 28 as in FIG. 3. In that position the ring is preferably in a non-expanded condition to minimise stress in the ring. Clutch release forces can then be applied to the hub 13 by applying a force to shaft 15 in the direction of arrow A, the frusto conical surfaces 22, 26 tending to urge the ring 20 towards the bottom of groove 24 thereby ensuring that the detent ring cannot expand out of engagement with the recess 28. The outer periphery of sleeve 25 frictionally engages the bore 1.

Figure 5:
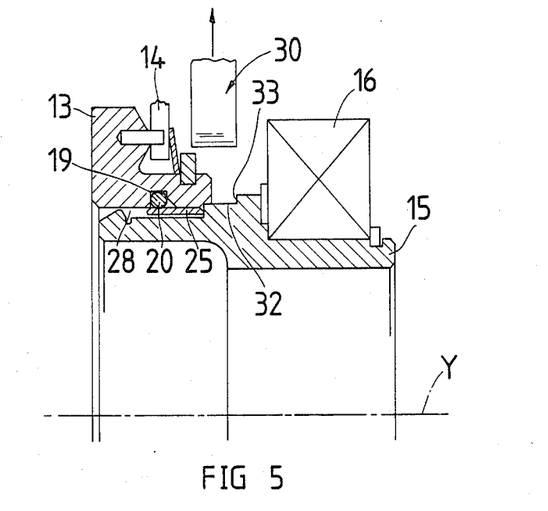
Figure 6:
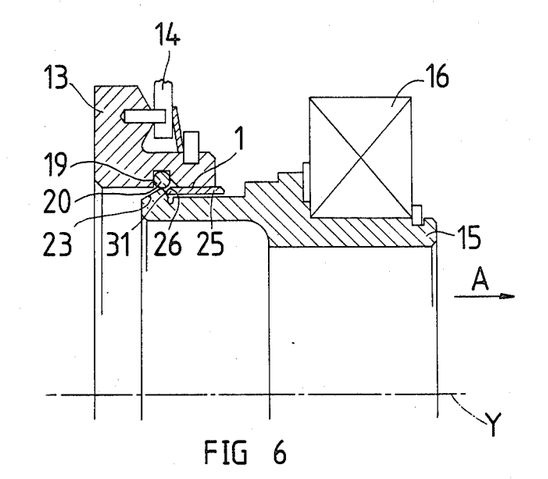

To disassemble the release mechanism, a force F in the direction of arrow B is applied to the shaft 15 which urges the left hand end of the sleeve 25 against the ring 20 as shown in FIG. 4. The ring 20 is thereby trapped between the end of ring 25 and the left hand surface of groove 19. The force F creates a reaction Fr at the groove 19 and has a component F1. The resultant of F1 and Fr is an outward force F2 which causes the ring 20 to expand into groove 19, ride up left hand surface 21 of the sleeve and onto the outer periphery of the sleeve 25 as in FIG. 5. In the FIG. 5 position, the ring 20 resiliently grips the sleeve 25 but not sufficiently to contract it out of frictional engagement with bore 1. The shaft 15 can then be moved in direction A to separate the spring hub 13 and shaft 15 to complete disassembly. On doing that the shaft 15 moves relative to the sleeve 25 until the shoulder 26 abuts the left-hand end of the sleeve. Further movement of the shaft in direction A causes the sleeve to slide within the ring 20 until the latter disengages the sleeve 25 as in FIG. 6 and finally rides down the frusto conical end surface 23 to resume in FIG. 2 condition. The frictional grip between the outer periphery of sleeve 25 and the bore 1 prevents the sleeve sliding towards shoulder 27 when the ring moves from the sleeve 5 onto a cylindrical rim 31 on shaft 15 between the shoulder 26 and surface 23. If desired, the rim may comprise a narrow edge formed by the intersection of surface 23 and shoulder 26.

It will be appreciated that both the detent ring 20 and the sleeve 25 are thereby retained on their associate members 13,15.

The hub 13 has a frusto conical lead-in surface 29 (FIG. 4) to aid assembly.

In order to expand the ring 20 during release, the diameter S (FIG. 2b) of the lines of intersection 60 on the sleeve 25 is less than the mean diameter R of the ring 20, e.g. by around 0.2 mm. The mean diameter R of the ring 20 is taken to be the diameter of the curve on which the centre of curvature C of the ring wire lies when the ring is positioned in the groove 24. The wire diameter of the ring 20 is preferably 3.0 mm nominal and this, together with the difference between the mean diameter R and the diameter S determines the angle which load component F makes with the clutch axis.

In order to prevent accidental release of the detent ring 20, a removable stop element 30 in the form of a spring clip 31 may be provided. In FIG. 3, the clip 31 is located around a cylindrical outer surface portion 32 of the shaft 15 in abutment with a shoulder 33. The shape of the clip 31 can be appreciated from FIG. 7 where it is seen that the clip has curved legs 34 having out-turned lower ends 35 and being interconnected at their upper ends by an arch 36. The legs 34 grip the cylindrical surface 32 as shown in broken lines in FIG. 7.

If an attempt is made to release the detent 20 by moving the shaft 15 in direction B, the clip 31 will abut the right hand end of hub 13 and limit movement in direction B to an amount which is insufficient to release the detent. To remove the clip 31 a suitable tool can be inserted beneath the arch to enable the clip to be moved upwards clear of the shaft 15 and hub 13 as in FIG. 5 to enable the detent to be released.

Figures 7, 8:
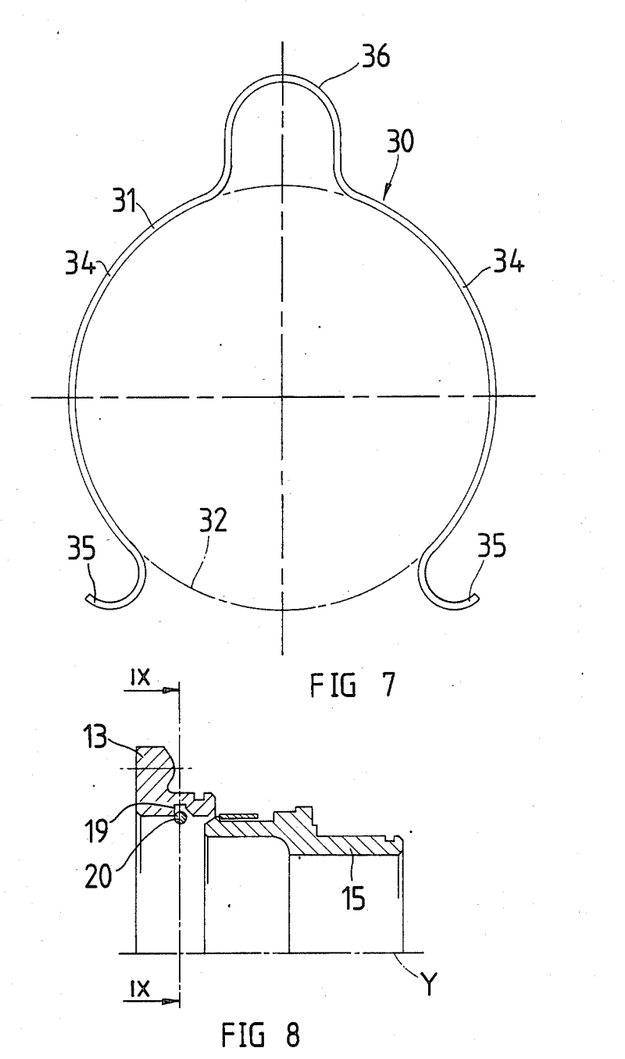
FIG. 7 is an end view of a stop element.
FIG. 8 shows a clutch mechanism similar to that in FIG. 2 but having a non-circular detent ring.
Figures 9, 10:
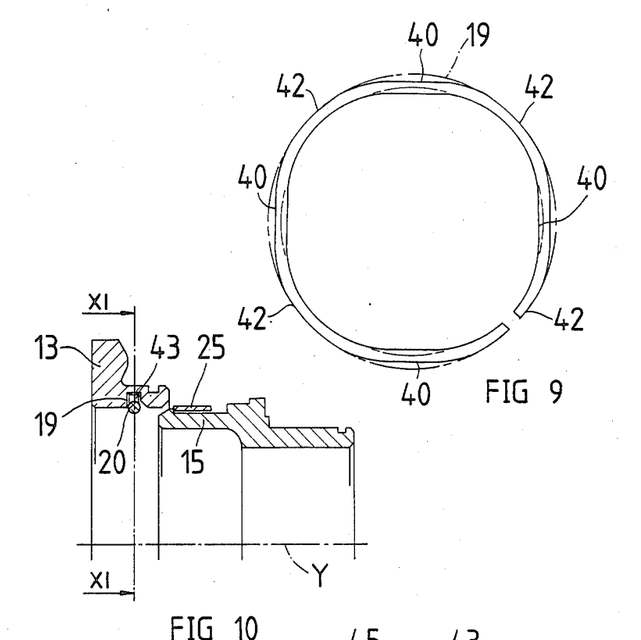
FIG. 9 is a cross section of line IX—IX in FIG. 8.
FIG. 10 shows a clutch release mechanism similar to that in FIG. 2 but having a polygonal centering spring for a detent ring.

Reference is now made to FIGS. 8 and 9. As mentioned above, the outer diameter of the ring 20 is less than that of the groove 19 to allow for expansion. However, the unequal diameters usually means that the ring 20 will not be coaxial with the hub 13 during assembly. As assembly is made easier when the ring and hub are coaxial it is proposed to form the detent ring 20 as shown in FIG. 9.

In FIG. 9 the ring is in the form of a quadrilateral having straight side sections 40 and rounded corners 42. When positioned in the groove 19, the corners 42 engage the bottom of the groove (shown in broken lines FIG. 9) thereby retaining the ring 20 in coaxial relation to the hub 13.

The average outer diameter of the ring 20 remains less than the diameter of the groove and the clearance between the bottom of the groove 19 and the straight side sections 40 permit expansion of the ring during assembly and disassembly of the release mechanism.

Figure 11:
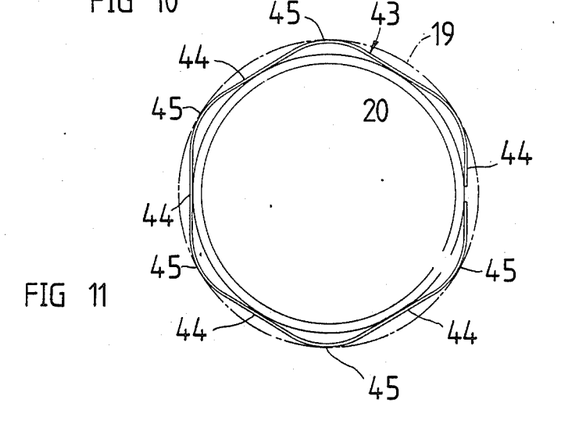
FIG. 11 is a cross-section on the line XI—XI in FIG. 10, FIGS. 12 and 13 show the release mechanism of FIG. 10 in operative and detent release conditions respectively.
Figure 12:
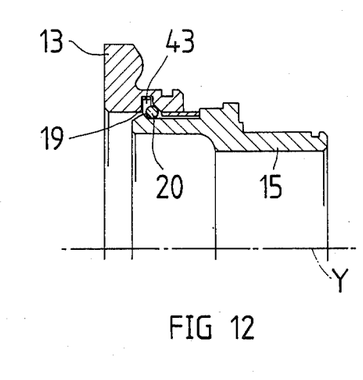
Figure 13:
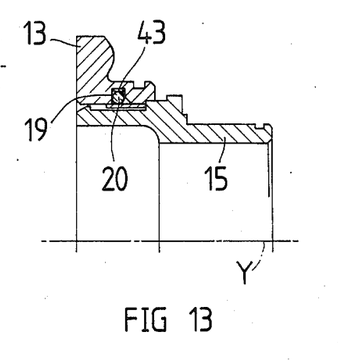
Figure 14:
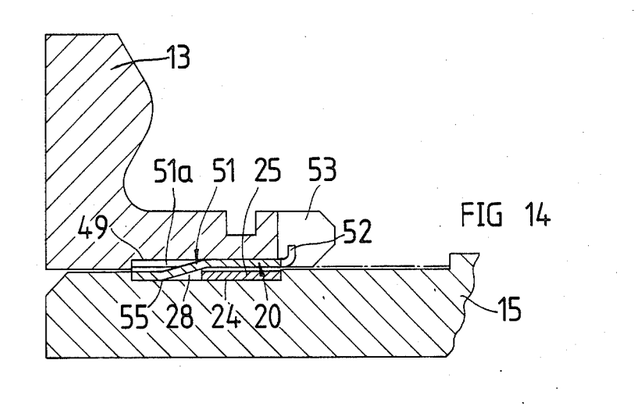
FIG. 14 shows a further clutch release mechanism of a friction clutch in accordance with the invention.

In FIGS. 10 and 11 the circular split ring 20 is used but is held in coaxial relation to the hub 13 by a polygonal split spring 43 formed from metal strip. The ring 20 engages flat sides 44 of the spring 43 and rounded corners 45 of the spring 43 engage the bottom of groove 19. During assembly and dis-assembly as in FIGS. 12 and 13, the spring 43 allows the detent ring to expand into the groove 19.

Reference is now made to FIGS. 14 to 17 in which parts corresponding to parts in FIGS. 1 to 13 carry the same reference numerals.

Figure 15:
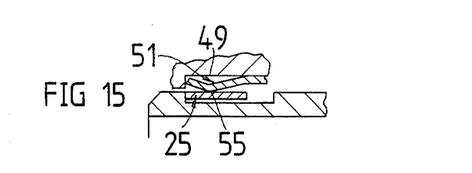
FIGS. 15 and 15a are views to a smaller scale of the mechanism of FIG. 14 in dis-assembly positions.
Figure 15A:
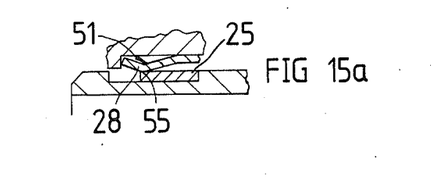
Figure 16:
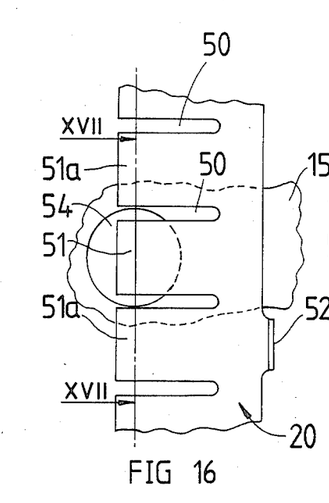
FIG. 16 is a plan view of part of the detent ring of FIG. 14 showing a location arrangement to prevent relative rotation between first and second members of the release mechansim and, FIG. 17 is a cross-section on the line XVII—XVII in FIG. 16.
Figure 17:
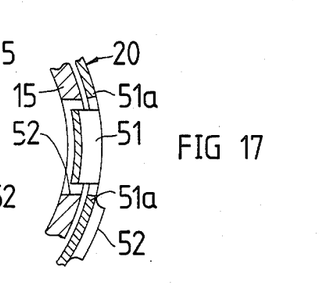

In FIGS. 14 to 17 the detent comprises a detent ring 20 located in a groove 49 in hub 13. The ring 20 is formed from strip steel bent into cylindrical form. The ring 20a is formed with a plurality of axial slits 50 as shown in FIG. 16. Alternate sections 51 of meterial between pairs of slits 50 are bent inwardly so that each section 51 is of obtuse axial cross-sectional shape as clear from FIGS. 15 and 15a. Intermediate unbent sections 51a remain between sections 51. The ring 20 is formed with one or a plurality of out-turned tabs 52 which locate in one or respective recesses 53 in the hub 13 and inhibit relative rotation between the hub 13 and ring 20. The release mechanism is assembled in the same way as those described with respect to FIGS. 1 to 13 so that the obtuse sections 51 locate in recess 28 as in FIG. 14 and the intermediate sections 51a locate in groove 49. At least one socket or aperture 54 is formed in the shaft 15 which receives a section 51 as in FIGS. 16 and 17 to inhibit relative rotation taking place between the shaft 15 and ring 20. The arrangement thereby inhibits relative rotation between the shaft 15 and hub 13. During disassembly, the sections 51 ride onto the outside of sleeve 25 as in FIG. 15 the sections 51 being received within groove 49. The hub 13 and shaft 15 can then be separated. The obtuse formation of each section 51 results in a slightly radiussed surface 55 on each section. This is useful in two respects i.e. (i) as shown in FIG. 15a the section 51 can be lifted clear of the recess 28 without having to move the sleeve 25 fully to the left hand ends of the sections 51 and (ii) the surface 55 rides easily onto the sleeve 25 to minimise risk of jamming.

The spring clip 31 could be used on the embodiment shown in FIGS. 14 to 17.

We claim:

1. A friction clutch for a vehicle which includes a clutch release mechanism comprising a first member, a second member, a detent arranged to locate and retain the first member relative to the second member on assembly by moving the first member in one direction relative to the second member whereby a clutch release force subsequently applied to said first member in an opposite direction will be transmitted to said second member to release the clutch and detent release means which enables the detent to be released by urging said first member further in said one direction relative to said second member so that the first and second members can thereafter be separated by moving said first member in said opposite direction, said detent being carried by one of said members and the detent release means being carried by the other of said members whereby on separation of the members following release of the detent said detent and detent release means disengage and remain on their respective members.

2. A friction clutch according to claim 1 in which the detent is a ring held axially captive on said one member and the detent release means is a sleeve held axially captive on said other member.

3. A friction clutch according to claim 1 in which the detent release means is movable axially on said other member to define a location recess between a shoulder on said other member and an adjacent surface of the detent release means which location recess, in use, locates part of the detent to enable clutch release forces to be transmitted, the detent including a further part located in a recess in said one member.

4. A friction clutch according to claim 3 in which a leading surface of said other member in the assembly direction is engageable with the detent whereby the detent is resiliently urged on assembly into the recess in the one member, said detent thereafter being arranged to snap into said location recess subsequent to disengaging said leading surface.

5. A friction clutch according to claim 4 in which the detent release means is arranged to resiliently urge the detent into said recess in said one member so as to disengage the location recess to effect release of the detent on movement of the first member in said one direction, whereby on separation of the first and second members relative movement will take place between the said other member and the detent release means until the detent release means and said one shoulder interengage enabling the detent to re-engage the leading surface of the other member.

6. A friction clutch according to claim 1 in which the detent release means comprises a sleeve, one end of which is arranged to engage the detent when said first member is moved in said one direction.

7. A friction clutch according to claim 6 in which said one end of the sleeve is formed with a chamfer over which the detent rides when moving into a released position on to a peripheral surface of the sleeve.

8. A friction clutch according to claim 6 in which there is a shoulder on said other member, said shoulder being of frusto conical form.

9. A friction clutch according to claim 1 in which there is a recess in said one member, having a wall of frusto-conical form.

10. A friction clutch according to claim 9 in which there is a shoulder on said other member of frusto-conical form and the angle of inclination to the clutch axis of said frusto conical shoulder is different from the angle of inclination to the clutch axis of said frusto conical wall.

11. A friction clutch according to claim 10 in which the frusto conical shoulder and frusto conical wall are inclined in approximately the same direction.

12. A friction clutch according to claim 1 in which the detent release means comprises a sleeve, having a peripheral surface which frictionally engages a surface of said one member.

13. A friction clutch according to claim 1 in which the detent comprises a split ring.

14. A friction clutch according to claim 1 in which the detent comprises a resilient non-circular split-ring having corners which engage in a tubular said one member so as to maintain the split ring coaxial with said one member.

15. A friction clutch according to claim 1 in which the detent comprises a split ring within a non circular surrounding element, said non-circular element having corners which engage in a tubular said one member so as to maintain the split ring coaxial with said one member.

16. A friction clutch according to claim 15 in which the split ring resiliently engages straight surface portions of said non circular element.

17. A friction clutch according to claim 15 in which the non circular element is polygonal.

18. A friction clutch according to claim 1 in which the detent is substantially rotatably fast with said one member.

19. A friction clutch according to claim 18 in which the detent means includes a projection which locates in said one member to inhibit relative rotation between the detent and said one member.

20. A friction clutch according to claim 18 in which a portion of said detent engages said other member so as to inhibit relative rotation between the first and second members.

21. A friction clutch according to claim 20 in which said portion of the detent locates in an aperture or socket in said other member.

22. A friction clutch according to claim 18 in which said detent comprises a split ring formed from a strip of material, said strip being formed with a plurality of axial slits extending from one edge thereof and having alternate sections of material between the slits bent for engagement with said other member.

23. A friction clutch according to claim 22 wherein the detent includes said projection, in which the projection is formed on an edge of the strip opposite said one edge.

24. A friction clutch according to claim 22 wherein a portion of the detent locates in an aperture or socket in the other member in which said portion comprises one of said alternate sections.

25. A friction clutch according to claim 1 in which the first member locates wihin a bore in the second member, the detent release means is carried by the first member and the detent is located in the bore between the two members and is arranged to ride on to an outer peripheral surface of the detent release means.

26. A friction clutch according to claim 1 in which an element is locatable between the first and second members to inhibit accidental release movement of the first member in said one direction relative to the second member which element can be so positioned as to permit release of said first member.

27. A friction clutch according to claim 26 in which the element is a spring which resiliently grips one of the members and which can be removed to permit said release.

28. A friction clutch according to claim 1 in which a section of said detent release means engageable with a surface of said detent to initiate release of the detent is arranged at a distance from a rotational axis of the clutch different from that of a centre of curvature of said surface of the detent.

29. A friction clutch according to claim 28 in which the detent release means is a sleeve formed with a chamfer and said section is a circumferential line of intersection of said chamfer and end of said sleeve.

* * * * *